April 29, 1924.
A. C. CHRISTENSEN
1,492,358
FLUID METER
Filed April 28, 1921
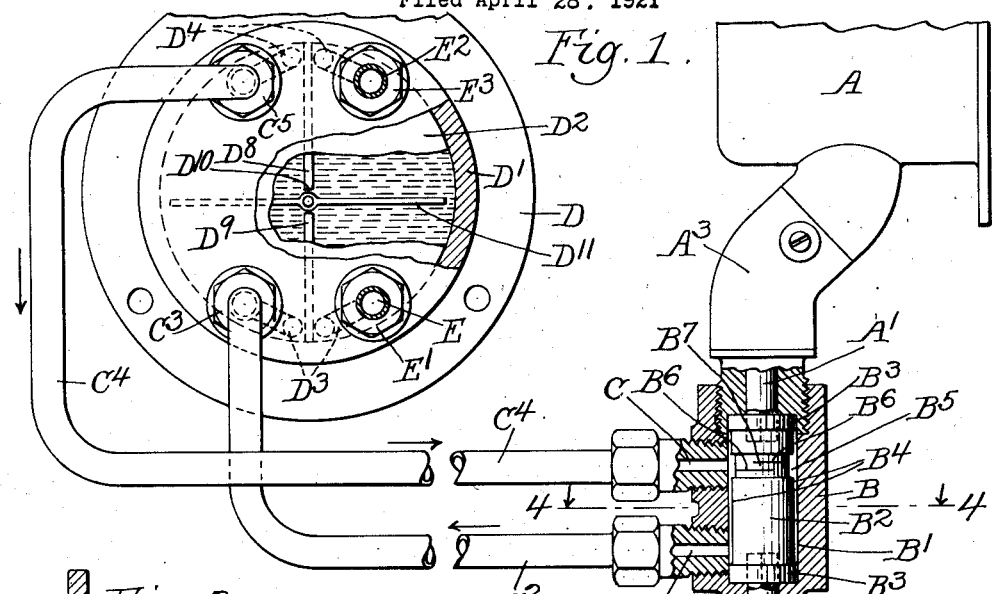
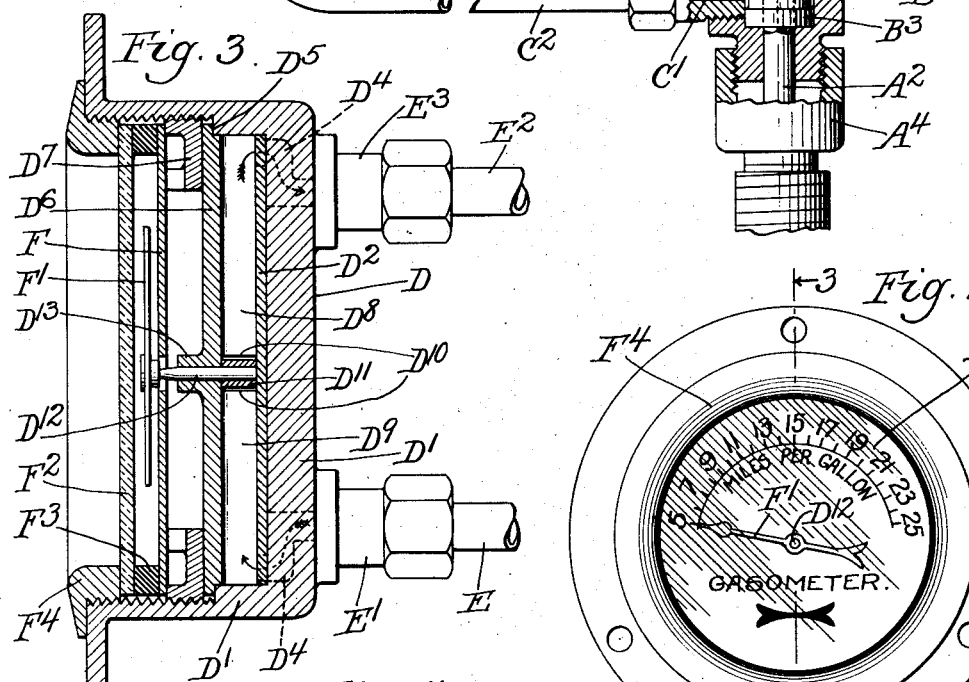
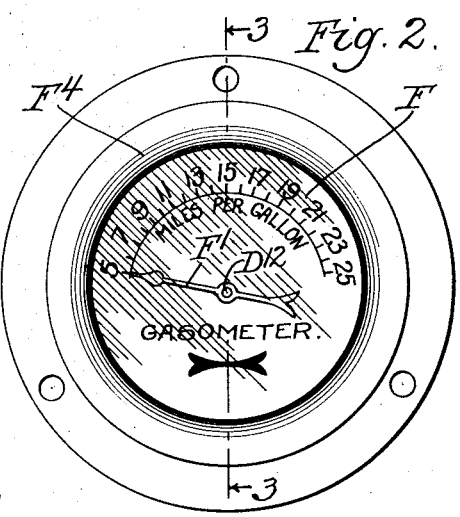
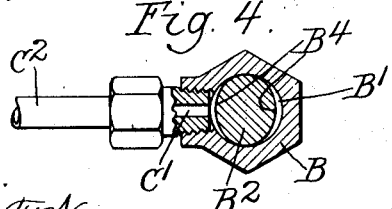
Witness.
Edward T. Wray.
Inventor.
Alfred C. Christensen.
by Parker & Carter,
Attorneys.

Patented Apr. 29, 1924.

1,492,358

UNITED STATES PATENT OFFICE.

ALFRED C. CHRISTENSEN, OF CHICAGO, ILLINOIS.

FLUID METER.

Application filed April 28, 1921. Serial No. 465,322.

*To all whom it may concern:*

Be it known that I, ALFRED C. CHRISTENSEN, a citizen of the United States, residing at Chicago, in the county of Cook and State of Illinois, have invented a certain new and useful Improvement in Fluid Meters, of which the following is a specification.

My invention relates to a meter for indicating the efficiency of an internal combustion engine and particularly to a meter and means for operating it, for indicating the efficiency of an automobile engine in terms of mileage per gallon of fuel consumed.

Inventors have in the past developed flow meters which indicate the consumption of fuel for any given period, and have combined such flow meters with the usual type of speedometer, so that the mileage per fuel unit can be computed. My invention relates to an indicator which makes such computation unnecessary. It is an improvement over earlier devices, particularly in its simplicity of action, in the small number of moving parts involved, and in the fact that it can easily be fitted into and be used with stock speedometer parts and vacuum systems.

I illustrate my invention more or less diagrammatically in the following drawings, wherein:

Figure 1, is an elevation of the indicating mechanism and the means for operating it, with parts in outline, and parts broken away;

Figure 2 is a front view of the indicating dial;

Figure 3 is a section on the lines 3—3 of Figure 2;

Figure 4 is a section on the lines 4—4 of Figure 1.

Like parts are indicated by like characters throughout the drawings.

A is the usual speedometer, not the subject of this invention, which is actuated by the usual rotating member $A'$ $A^2$, which is enclosed within encasing members $A^3$ $A^4$. B is a casing with an interior cylindrical pump chamber $B'$, in which rotates a rotary pump rotor $B^2$, inserted intermediate the rotating members $A'$ $A^2$, and rotating with them. The ends are circular in cross section as at $B^3$ $B^3$. Adjacent one end of the cylinder is a circumferential groove $B^5$. Adjacent or within this slot the rotor is cut through by two over-lapping cuts $B^6$ $B^6$, in such wise that the thin intermediate strip of metal $B^7$ has a spring action, and serves to compress the ends of the rotor axially against the ends of the pump chamber.

The chamber $B'$ is penetrated by two openings C, $C'$. Of these, $C'$ leads, through the pipe $C^2$ to the connection $C^3$ in the gauge D which will later be described. The opening C which enters to the pump chamber adjacent the circumferential groove $B^5$ is connected with the pipe $C^4$ which leads from the outlet $C^5$ in the gauge D. These passages are so arranged that when the centrifugal pump is rotated there will be a flow from the pump through the passage $C'$ to the gauge.

The gauge D is composed of an outer casing $D'$, in which are the connections $C^3$, $C^5$ with the pump above described. In the bottom of the casing lies a thin disc $D^2$ which serves to cover the inlet passages, $D^3$ $D^4$, when it is wished to carry them through into the interior of the gauge at a point removed from the outer connections $C^3$ $C^5$. Compressed against a ledge $D^5$ on the interior of the gauge casing is a disc $D^6$, locked in place by a lock nut $D^7$. This disc, when locked in place, forms a closed fluid chamber, which is separated into two preferably equal parts by the vertical partitions $D^8$ $D^9$, which may be made integral with the disc $D^6$. There is a space $D^{10}$ between these partitions, within which is pivoted a movable vane $D^{11}$, which is mounted on a pin $D^{12}$ rotating in the bearing $D^{13}$ of the disc $D^6$. There is a slight space between the inner ends of the partitions $D^8$ $D^9$ and of the rotating vane $D^{11}$, so that a fluid in one chamber will pass slowly through to the other chamber.

The pipe E, connected as at $E'$ to the gauge D, leads from a vacuum tank not here in shown. The pipe $E^2$ which serves to connect the gauge to the carburetor, is connected as at $E^3$ to the gauge. It will be noted that the pivotal point of the rotating vane is in the vertical plane of the center of the fluid chamber, but slightly below the center. F is an indicating dial and $F'$ is an indicating needle mounted on the pin $D^{12}$. The plate of glass $F^2$ is superimposed on the dial, spaced from it by a spacer $F^3$ and positioned by the containing rim $F^4$. The meter is marked as illustrated in Figure 2 to show the efficiency of fuel consumption in terms of miles per gallon.

While I have illustrated an operative mechanism, I wish my description and drawings to be taken as in a sense diagrammatical and it is obvious that great changes might be made in the size, number, relation and disposition of parts, without departing from the spirit of my invention. It is obvious, for example, that other means might be used to seat the rotor, that oil proof packings would be used if and wherever necessary, and that other forms of pumps might be used, either driven directly by the speedometer driving means, or otherwise responsive to the speed of the locomotion of the vehicle.

The use and operation of my invention are as follows:

I provide a device for measuring the efficiency of an engine in terms of the mileage obtained per gallon consumed. It will be obvious that the rate will fluctuate from time to time and under varying conditions of weight and load, but the operator will be easily able to follow the general performance of his engine.

I construct my gauge with a fuel chamber, divided into two parts, with a vane pivoted therein, one-half of which lies in one section and the other half in the other section of the divided chamber. The fuel passes from the vacuum tank into one of these sections or compartments around the end of the pivoted vane and thence out of the gauge to the carburetor. Thus the flow of fuel to the carburetor exerts pressure upon the pivoted vane and tends to lift one end of it, and thus move the indicating needle. The other side or section is connected with the rotary pump system. This system is filled with gasolene, there being an aperture in which the vane is pivoted, but the leak in the system is so small as not to affect the record of the meter. The flow of fluid about the end of the vane opposite to the one impelled by the flow of fuel to the carburetor, varies in relation to the speed of the car, as the rotation of the pump is directly responsive to the rotation of the speedometer shaft. The vane thus fluctuates in response to the varying balance between the flow of fuel and the carburetor, and the flow of liquid impelled by the pump.

It will be noted that the vane is pivoted below the center of the gauge, in such wise that, when either end of the vane rises, the aperture between it and the chamber increases, while the aperture between the lowered end of the vane and the chamber wall decreases. Thus a balance in the position of vane and needle is rapidly reached. The balance between the two impulses is recorded on the indicating scale in terms of miles per gallon, the needle, in Figure 2 tending to move to the right, as the flow delivered by the pump increases in relation to the flow of fuel to the carburetor.

It will be noted that the inlet into or the outlet from the chamber itself is in each case made closely adjacent the vertical partition, in order to give the pivoted vane a maximum possible movement.

I claim:

1. An indicator for internal combustion propelled vehicles, adapted to indicate the relation of the distance covered to the fuel consumed, and means for actuating it comprising a fluid chamber, a vane pivoted therein, means for directing about one end of the vane the flow of fuel to the carburetor, and about the other end of the vane a flow of fluid adapted to vary in volume with the speed of the vehicle.

2. An indicator for internal combustion propelled vehicles, adapted to indicate the relation of the distance covered to the fuel consumed, and means for actuating it comprising a plurality of fluid chambers, a vane so pivoted that one side of it lies in each of said chambers, means for directing through one chamber and about one end of the vane the flow of fuel to the carburetor, and means for directing through the other chamber and about the other end of the vane a flow of fluid adapted to vary in volume with the speed of the vehicle.

3. An indicator for internal combustion vehicles, adapted to indicate the relation of the distance covered to the fuel consumed, and means for actuating it comprising a pump actuated in response to the locomotion of the vehicle, a fluid chamber, a vane pivoted in said chamber, means for directing about one end of the vane the flow of fuel to the carburetor and means for directing about the other end of the vane the flow of fluid actuated by said pump.

4. An indicator for internal combustion vehicles, adapted to indicate the relation of the distance covered to the fuel consumed, and means for actuating it comprising a pump actuated in response to the locomotion of the vehicle, a plurality of fluid chambers, a vane so pivoted that one side of it lies in each of said chambers, means for directing through one chamber and about one end of the vane the flow of fuel to the carburetor, and means for directing through the other chamber and about the other end of the vane the flow of fluid actuated by said pump.

5. An indicator for internal combustion vehicles, adapted to indicate the relation of the distance covered to the fuel consumed, and means for actuating it comprising a rotary pump adapted to be driven from the speedometer drive, a fluid chamber, a vane pivoted in said chamber, means for directing about one end of the vane the flow of fuel to the carburetor and means for directing about the other end of the vane the flow of fluid actuated by said pump.

6. An indicator for internal combustion vehicles, adapted to indicate the relation of the distance covered to the fuel consumed, and means for actuating it comprising a rotary pump adapted to be driven from the speedometer drive, a plurality of fluid chambers, a vane so pivoted that one side of it lies in each of said chambers, means for directing about one end of the vane the flow of fuel to the carburetor and means for directing about the other end of the vane the flow of fluid actuated by said pump.

7. An indicator for internal combustion vehicles, adapted to indicate the relation of the distance covered to the fuel consumed, and means for actuating it comprising a rotary pump adapted to be driven from the speedometer drive, a fluid chamber, a vane pivoted in said chamber, means for directing about one end of the vane the flow of fuel to the carburetor and means for directing about the other end of the vane the flow of fluid actuated by said pump.

8. An indicator for internal combustion propelled vehicles, comprising an indicating element adapted to indicate the relation of the distance covered to the fuel consumed, and adapted to be actuated by the balanced impulse of the flow of fuel to the carburetor, and the flow of liquid through a secondary pumping circuit, and pumping means for said circuit responsive to the speed of locomotion of the vehicle.

9. An indicator for internal combustion propelled vehicles, comprising an indicating element adapted to indicate the relation of the distance covered to the fuel consumed, and adapted to be actuated by the balanced impulse of the flow of fuel to the carburetor, and the flow of liquid through a secondary pumping circuit, and pumping means for said circuit responsive to the speed of locomotion of the vehicle, and adapted to be driven by the speedometer drive.

10. An indicator for internal combustion propelled vehicles, comprising an indicating element adapted to indicate the relation of the distance covered to the fuel consumed, and adapted to be actuated by the balanced impulse of the flow of fuel to the carburetor and the flow of liquid through a secondary pumping circuit, and pumping means for said circuit, responsive to the speed of locomotion of the vehicle comprising a speedometer actuating member, a pump cylinder intermediate the ends thereof, and a pump rotor therein adapted to be rotated by said member.

11. An indicator for internal combustion propelled vehicles comprising an indicating element adapted to indicate the relation of the distance covered to the fuel consumed, and adapted to be actuated by the balanced impulse of the flow of fuel to the carburetor and the flow of liquid through a secondary pumping circuit, pumping means for said circuit, responsive to the speed of locomotion of the vehicle, a metering member comprising a substantially circular fluid chamber, an indicating element comprising a vane therein pivoted off the center of the chamber, and means for directing about one end of the vane the flow of fluid from the pumping circuit and about the other flow of fuel to the carburetor.

12. In an indicator actuated by opposed currents of fluid, a fluid chamber, and means for admitting said opposed currents thereto, a vane pivoted therein in such relation to the walls of the chamber that the distance between either end of the vane and the walls of the chamber increases as the end of the vane rises and diminishes as the end of the vane is depressed, and an indicating needle connected to said vane.

13. In an indicator actuated by opposed currents of fluid, a circular fluid chamber, and means for admitting said opposed currents thereto, a vane pivoted adjacent the center of the chamber, but spaced therefrom, and an indicating needle actuated by said vane.

14. An indicator for internal combustion propelled vehicles, comprising an indicating element adapted to indicate the relation of the distance covered to the fuel consumed, and adapted to be actuated by the balanced impulse of the flow of fuel to the carburetor, and by a flow of fluid generated by pumping means responsive to the speed of locomotion of the vehicle, said pumping means comprising a speedometer actuating member, a pump cylinder intermediate the ends thereof, a pump rotor therein adapted to be rotated by said member and yielding means integral with the rotor for pressing the ends of the rotor against the ends of the cylinder.

Signed at Chicago, county of Cook, and State of Illinois, this 26th day of April 1921.

ALFRED C. CHRISTENSEN.